United States Patent Office 3,335,655
Patented Aug. 15, 1967

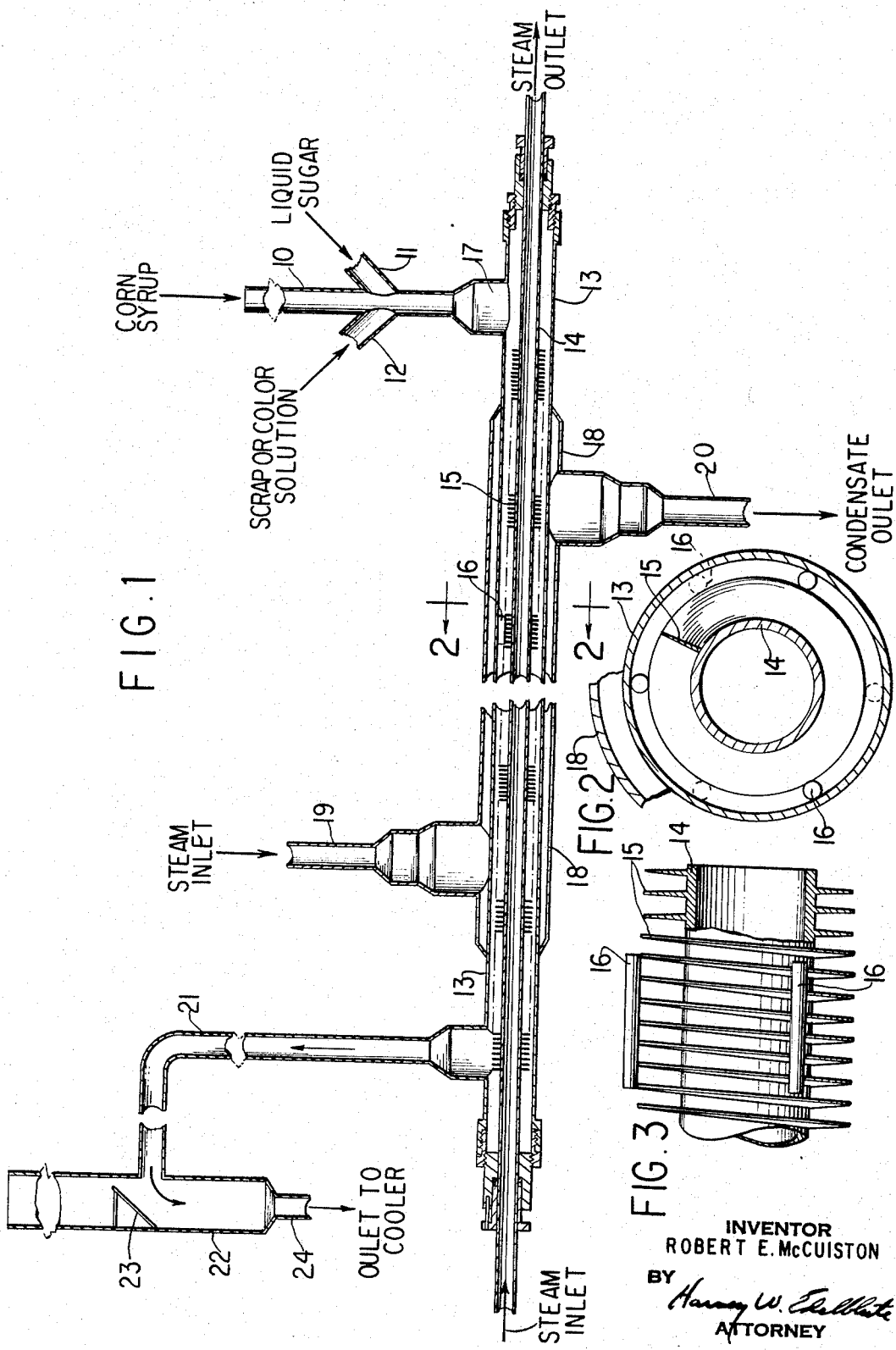

3,335,655
CONTINUOUS CANDY COOKER
Robert E. McCuiston, Greensboro, N.C., assignor to Richardson-Merrell Inc., New York, N.Y., a corporation of Delaware
Filed June 21, 1966, Ser. No. 559,161
1 Claim. (Cl. 99—234)

ABSTRACT OF THE DISCLOSURE

Apparatus for continuous candy cooking which involves passing an aqueous solution of saccharides through a narrow spiral passageway through which the solution flows with high turbulence in the absence of oxygen at temperatures between 320 and 350° F. during a period of time of between 40 seconds to 120 seconds after which the cooked candy is discharged at atmospheric pressure to a suitable receiving means.

---

This invention relates to the art of making hard candy. More particularly, this invention relates to apparatus for cooking saccharide solutions continuously for the manufacture of hard candy.

As generally understood, hard candy is a solidified solution of amorphous saccharides which has been cooked to so high a temperature that most of the moisture is removed. The solid solution is usually clear but has been modified with flavoring agents, colors, and in the case of cough drops, medicaments of various kinds.

Normally, hard candy is made from a mixture of 60 to 80 percent by weight of sucrose and 20 to 40 percent by weight of corn syrup or invert sugar and water. Although sucrose is the principal ingredient that goes into hard candy, it is not possible to prepare commercially acceptable hard candy from sucrose alone because the highly concentrated sucrose solution forms crystals or grains when cooled. Invert sugar or corn syrup is often used in hard candy manufacturing processes to control the graining of sucrose and the use of these latter materials has made the mass production of clear forms of hard candy possible. However, invert sugar and to a lesser extent corn syrup adds hygroscopicity to the hard candy. Too much hygroscopicity makes the candy sticky and difficult to handle. Thus in hard candy making, a suitable balance must be achieved between the amount of sucrose and the amount of corn syrup and/or invert sugar that is added to prevent graining. In addition, it is economically desirable to include in the raw materials used in preparing hard candy small amounts of so-called scrap which is largely broken pieces of the hard candy which have been dissolved in water for easy handling.

The cooking process inverts the sucrose to D-glucose and fructose and reduces the moisture content. Normally, the candy is first cooked by heating for five to ten minutes an aqueous solution made up of sucrose, invert sugar or corn syrup, and scrap, if such is available, in a steam jacketed coil at 275° F. to 300° F. to invert the sucrose. The hot solution is discharged from the heating coil continuously into a vacuum pan operating under about 15 inches of mercury where the moisture content is reduced down to less than about 4 percent. When a sufficient quantity of hard candy is accumulated in the vacuum pan, the vacuum is broken, and the hot candy mass at a temperature of about 270° F. is transferred to a cooled mixing table where colors, flavors, and medicinal ingredients are mixed in.

The equipment used to apply vacuum to the heated candy mass for the purpose of removing water is cumbersome and expensive, and its operation requires a great deal of labor. Several attempts have been made, therefore, to make the candy cooking process an automatic and continuous one. In one such device, the hot sucrose-invert sugar solution which contains about 20 percent of water is sprayed on the vertical walls of an open tubular steam jacketed heat chamber which has mounted on its vertical axis a rotor with many long vertically disposed blades extending out almost to the inner surface of the chamber. These blades spread out the hot candy solution to a thin film of about 1/16 of an inch in thickness. The molten hot candy in the film gradually settles to the lower end of the tubular chamber and is discharged onto cooling and mixing machinery. The rotor turns at the rate of about 1,000 revolutions per minute and must be carefully adjusted and maintained in order to perform its proper function of spreading the candy on the surface of the evaporator in a thin film. This type of equipment, while it does not require as much hand labor as in the case of older types of candy cookers and is continuous in operation, is nevertheless expensive to purchase, install, and maintain.

The present invention relates to an apparatus for the continuous production of hard candy which is free of moving parts and does not require vacuum for removal of moisture. It is relatively inexpensive to build and install. Practically no maintenance is involved. It can be used to cook aqueous solutions of sucrose, invert sugar, corn syrup, and other candy-making components with a high degree of speed and efficiency yielding a candy product that is suitably low in moisture, less than 4 percent by weight, and of a good clear light color. Because of the unique construction of the candy cooker of the present invention, higher cooking temperatures than previously thought possible can be used.

The novel construction of the new candy cooker will be explained by reference to the accompanying drawing in which:

FIGURE 1 is a cross section, in elevation, of the candy cooker of the present invention with a section broken out for convenience in illustration. Non-essential elements of the candy cooker are omitted for clarity;

FIGURE 2 is a cross section, in elevation, of a tubular section of the candy cooker taken along the line 2—2 of FIGURE 1 with parts broken away and slightly enlarged; and FIGURE 3 is an elevational view, partly in cross section and slightly enlarged over FIGURE 1, of a short length of the internal element of the candy cooker of the present invention.

Referring again to FIGURE 1, it will be seen that the new candy cooker of the present invention comprises means for introducing corn syrup 10, an aqueous solution of sugar 11 and 12, a solution of candy scrap or other material that may be desirable to add to the candy. These means are conventional tubing of copper or other metal which is non-corrosive and inert to the sugar solution. These individual lines are fed with the desired solution by means of metering pumps (not shown), which withdraw the aqueous solutions from preheated holding tanks in desired proportions. As will be apparent, the apparatus can be used to cook any number of different solutions depending on the nature of the product to be manufactured. Normally, there are three (3) feed lines into the main candy cooker as shown in the drawing but fewer can be used, if desired.

The main body of the candy cooker 13 is a simple pipe or tube of copper, stainless steel, or other material having good heat transfer qualities and capable of withstanding a reasonable pressure. In one successful candy cooker this tube had an outside diameter of 2.625 inches with an inside diameter of 2.44 inches and was made of seamless copper tubing. It had an over-all length of about 14 feet. Inside of this straight piece of copper tubing was installed a length of copper tubing having spiral fins 15 integral with the tubing section 14. In the particular installation described, the tubing had five (5) of such fins per inch. This finned tubing was spaced apart from the inner walls of the outer tubing 13 by means of spacers 16 which were small brass bars of about 5/16 inch in diameter and about 1 inch in length. As will be noted, the spiral fins extend from the inlet 17 to the outlet 18 of the cooking tube. The remainder of the tube 14 need not have fins.

Tube 13 is suitably jacketed 18 and is connected with a steam inlet 19 and a condensate outlet 20 whereby steam under pressure may be passed through the annular space provided between the outer surface of the cooking tube 13 and the inner surface of the jacket 18 as shown in the drawing. Steam may also be introduced through the finned tube 14.

Other elements of the novel cooker of the present invention include a short length of outlet tubing 21 which leads to a flash chamber 22 which is provided with a suitable baffle 23 to divert the outwardly flowing stream of cooked candy downwardly and through outlet 24 to a suitable means for cooling the candy which may be nothing more than a steel pan. The flash chamber 22 is open to the atmosphere as shown in the drawing.

To prepare hard candy with the apparatus of the present invention, aqueous solutions of sucrose and glucose are prepared and, preferably, preheated up to about 240° F. These solutions may be prepared in steam jacketed holding kettles (now shown in the drawing) to which a metering pump is connected so as to continuously pump the liquid sugar and corn syrup into the apparatus as shown in the drawing. The proportion of corn syrup or invert sugar to sucrose may vary considerably. An aqueous solution of scrap candy up to about 10 percent of the total material passed through the cooker may also be pumped through a metering pump into the feed line 17. Generally, the mixed saccharide solution will contain about 20 percent by weight of water. Steam at 120 to 150 pounds of pressure is passed through the inner finned tube and also through the outer jacket of the cooker so as to raise the temperature of the candy solution up to 320 to 350° F. as it passes through the cooker. The solution may be in the cooker from about 40 seconds to about 120 seconds, but preferably not over about one (1) minute. When the candy is discharged into the flash chamber, moisture is immediately released and the candy is dropped through the outlet to a cooling slab. When properly operated, the moisture content can be reduced to below 2 percent without burning the candy. This degree of moisture removal is considered satisfactory for most hard candy.

Mixing of flavoring agents, colors, medicinal substances, acids, and other materials can take place in the usual manner after the cooked candy has been discharged from the flash chamber.

A number of important advantages of the new candy cooker of the present invention may be pointed out. The candy cooker itself has no moving parts, and consequently, it is inexpensive to install and maintain. No vacuum is required to produce a product containing as low as 2 percent moisture. This also leads to simplicity of operation and lower installation and operating costs.

Surprisingly, the candy cooker does not carmelize or add appreciable color to the sucrose-glucose solution at the high temperatures of 340 to 350° F. This is most surprising in view of the tendency of these saccharides to darken when heated at this high temperature. Apparently, the lack of exposure to oxygen in the closed cooker and the high turbulence which the solution undergoes while passing through the tortuous passageway formed by the spiral fins on the tube makes it possible to carry out the candy cooking process at these high temperatures without discoloration.

It is also surprising that the moisture content can be reduced from approximately 20 percent to around 2 percent by simply discharging the cooked candy into an open flash chamber as shown in the drawing.

Another advantage of the new candy cooker of the present invention is the fact that it takes up practically no floor space. If desired, it can be hung from the ceiling of the room in which it is installed.

The cooking capacity of the candy cooker is also very good. A cooker 12 feet in length with the body tube 13 as described above having an internal diameter of about 2.50 inches can cook about 700 pounds of candy per hour under the conditions described.

If desired, the cooker of the present invention can be used as a preheater to increase the capacity of candy cookers already existing in the plant. In such a case, the spiral finned tube can be shorter in length, for example, about 6 feet long. On the other hand, when using larger diameter tubes for the cooker, the length of the cooking chamber containing the spiral finned tube may be up to 30 feet. Increased capacity is obtained with larger and longer tubes.

Another important advantage of the cooker of the present invention is the fact that it is not necessary to wash it out at the end of a day's operation. To conclude a cooking cycle, it is simply necessary to turn off the steam for about 30 seconds before stopping the flow of aqueous solution through the cooker. The tailings from such a purging process are returned to the holding tanks where they may be used during the next cycle. As will be apparent, no labor is involved in this cleaning process.

What is claimed is:

A candy cooker characterized in having a long tubular element of relatively small internal diameter having centrally disposed therein along its longitudinal axis a second tubular element having a thin continuous section integral with the said second tubular element and extending therefrom to within a short distance of the interior walls of the first named tubular element said section advancing on a spiral of low pitch along the outer periphery of said second tubular element to provide a spiral passageway through which a candy solution can pass from one end of the first tubular element to the other, means for introducing an aqueous solution of saccharides at one end of said spiral passageway and means at the other end of said passageway for removing cooked candy solution, a tubular passageway leading from one end of the first named tubular element to a flash chamber which is open to the atmosphere at the bottom and the top thereof for receiving a cooked candy solution, baffle means disposed within said flash chamber to divert a stream of molten candy entering said flash chamber downwardly, means for introducing steam through the interior of the tubular section with spiral radial fins, a tubular jacket enclosing the first named outer tubular member to form an annular steam jacket, means for introducing steam into one end of said annular steam jacket and means for removing condensate at the other end thereof.

References Cited

UNITED STATES PATENTS

| | | | |
|---|---|---|---|
| 2,066,480 | 1/1937 | McKerrall | 165—156 X |

FOREIGN PATENTS

| | | |
|---|---|---|
| 416,582 | 8/1910 | France. |
| 660,897 | 2/1929 | France. |
| 15,535 | of/1908 | Great Britain. |
| 883,440 | 11/1961 | Great Britain. |
| 980,936 | 1/1965 | Great Britain. |
| 593,169 | 5/1959 | Italy. |

WALTER A. SCHEEL, *Primary Examiner.*

J. M. NEARY, *Assistant Examiner.*